(12) United States Patent
Lian et al.

(10) Patent No.: US 11,161,401 B2
(45) Date of Patent: Nov. 2, 2021

(54) ELECTRIC VEHICLE AND VEHICLE BODY STRUCTURE OF ELECTRIC VEHICLE

(71) Applicant: BYD COMPANY LIMITED, Guangdong (CN)

(72) Inventors: Yubo Lian, Shenzhen (CN); Feng Yang, Shenzhen (CN); Xinchun Liu, Shenzhen (CN); Ming Ji, Shenzhen (CN); Bengang Yi, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 135 days.

(21) Appl. No.: 16/627,626

(22) PCT Filed: Jun. 28, 2018

(86) PCT No.: PCT/CN2018/093439
§ 371 (c)(1),
(2) Date: Dec. 30, 2019

(87) PCT Pub. No.: WO2019/001530
PCT Pub. Date: Jan. 3, 2019

(65) Prior Publication Data
US 2020/0148050 A1 May 14, 2020

(30) Foreign Application Priority Data
Jun. 30, 2017 (CN) .......................... 201710527328.2

(51) Int. Cl.
*B60J 7/00* (2006.01)
*B60K 1/04* (2019.01)
(Continued)

(52) U.S. Cl.
CPC ................ *B60K 1/04* (2013.01); *B60L 50/66* (2019.02); *B62D 21/02* (2013.01); *B62D 21/155* (2013.01);
(Continued)

(58) Field of Classification Search
CPC ...... B01D 15/422; G01N 30/02; B65D 27/00; G02F 1/134327; G09G 3/18; B60R 19/18;
(Continued)

(56) References Cited

U.S. PATENT DOCUMENTS 8,672,354 B2 * 3/2014 Kim ....................... B62D 21/10
280/783
8,936,126 B2 * 1/2015 Nitawaki ................. B60K 1/04
180/68.5
(Continued)

FOREIGN PATENT DOCUMENTS

CN 100999232 A 7/2007
CN 101209716 A 7/2008
(Continued)

OTHER PUBLICATIONS

English Translation of International Search Report from PCT/CN2018/093439 dated Oct. 10, 2018 (2 pages).

*Primary Examiner* — Kiran B Patel
(74) *Attorney, Agent, or Firm* — Calfee Halter & Griswold LLP (57) ABSTRACT

A vehicle body structure of an electric vehicle is provided, including a floor panel and a battery pack anti-collision structure. A battery pack and a motor are disposed below the floor panel, and the motor is located behind the battery pack. The battery pack anti-collision structure is disposed between the battery pack and the motor, and is configured to prevent the motor from crashing into the battery pack when a rear collision occurs to the electric vehicle.

18 Claims, 10 Drawing Sheets

(51) Int. Cl.
*B60L 50/60* (2019.01)
*B62D 21/02* (2006.01)
*B62D 21/15* (2006.01)
*B62D 25/20* (2006.01)

(52) U.S. Cl.
CPC ....... *B62D 21/157* (2013.01); *B62D 25/2027* (2013.01); *B62D 25/2036* (2013.01); *B60K 2001/0438* (2013.01)

(58) Field of Classification Search
CPC .. F03B 17/064; F03B 1/00; F03B 1/02; F03B 1/04
See application file for complete search history.

(56) References Cited

U.S. PATENT DOCUMENTS

| | | | | |
|---|---|---|---|---|
| 9,227,582 | B2 * | 1/2016 | Katayama | B60L 3/0046 |
| 9,499,205 | B1 * | 11/2016 | Elia | B60K 1/04 |
| 9,623,911 | B2 * | 4/2017 | Kano | B62D 25/12 |
| 9,937,781 | B1 * | 4/2018 | Bryer | B60K 1/04 |
| 9,944,162 | B2 * | 4/2018 | Li | B62D 25/2036 |
| 10,486,746 | B2 * | 11/2019 | Kawabe | B60L 50/66 |
| 10,787,070 | B2 * | 9/2020 | Kappich | B62D 25/20 |
| 10,787,206 | B2 * | 9/2020 | Nagano | B62D 35/02 |
| 2004/0235315 | A1 * | 11/2004 | Masui | B60L 3/0046 439/34 |
| 2010/0264699 | A1 * | 10/2010 | Wang | B62D 25/2036 296/193.07 |
| 2012/0049572 | A1 * | 3/2012 | Hashimura | B60L 53/14 296/187.11 |
| 2014/0302362 | A1 * | 10/2014 | Takizawa | B60K 1/04 429/83 |
| 2016/0141586 | A1 * | 5/2016 | Fujii | H01M 50/502 429/99 |
| 2016/0355100 | A1 * | 12/2016 | Ito | H01M 10/625 |
| 2018/0086192 | A1 * | 3/2018 | Ishihara | B60R 16/0207 |
| 2018/0244142 | A1 * | 8/2018 | Takayanagi | B60K 15/063 |
| 2018/0345817 | A1 * | 12/2018 | Yamamoto | B60L 11/1877 |
| 2019/0016391 | A1 * | 1/2019 | Inoue | B62D 21/155 |
| 2019/0047393 | A1 * | 2/2019 | Kato | B60K 1/04 |
| 2019/0275876 | A1 * | 9/2019 | Fukui | B62D 25/2027 |
| 2019/0276093 | A1 * | 9/2019 | Tatsuwaki | B62D 21/152 |
| 2019/0312320 | A1 * | 10/2019 | Uchiyama | H01M 50/20 |
| 2020/0114747 | A1 * | 4/2020 | Lian | B62D 21/09 |
| 2020/0114978 | A1 * | 4/2020 | Liu | B62D 21/02 |
| 2020/0140016 | A1 * | 5/2020 | Liu | B62D 25/20 |
| 2020/0156706 | A1 * | 5/2020 | Morimoto | B62D 25/2027 |
| 2020/0313256 | A1 * | 10/2020 | Kuronuma | H01M 10/6563 |
| 2020/0361534 | A1 * | 11/2020 | Matsuda | B62D 25/145 |
| 2020/0365850 | A1 * | 11/2020 | Shinoda | B60L 58/26 |
| 2020/0369166 | A1 * | 11/2020 | Tanaka | B60L 50/71 |
| 2020/0376948 | A1 * | 12/2020 | Yamada | H01M 50/20 |
| 2021/0001701 | A1 * | 1/2021 | Hoshinoya | B60K 6/26 |
| 2021/0006124 | A1 * | 1/2021 | Kobayashi | B60R 16/03 |
| 2021/0061081 | A1 * | 3/2021 | Kodama | B62D 25/2027 |
| 2021/0122221 | A1 * | 4/2021 | Nakamura | B60K 1/04 |
| 2021/0147001 | A1 * | 5/2021 | Lian | B62D 21/152 |

FOREIGN PATENT DOCUMENTS

| | | |
|---|---|---|
| CN | 201347133 Y | 11/2009 |
| CN | 201392851 Y | 1/2010 |
| CN | 103935224 A | 7/2014 |
| CN | 203713512 U | 7/2014 |
| CN | 106585722 A | 4/2017 |
| JP | 01248010 A | 10/1989 |
| JP | 2017074819 A | 4/2017 |

* cited by examiner

ELECTRIC VEHICLE AND VEHICLE BODY STRUCTURE OF ELECTRIC VEHICLE

CROSS-REFERENCE TO RELATED APPLICATIONS

This application is based on International Application No. PCT/CN2018/093439, filed on Jun. 28, 2018, which claims priority to and benefits of Chinese Patent Application No. 201710527328.2, filed with the State Intellectual Property Office of P. R. China on Jun. 30, 2017. The entire contents of the above-referenced applications are incorporated herein by reference.

FIELD

The present disclosure relates to a vehicle body structure, and further to an electric vehicle with the vehicle body structure.

BACKGROUND

To minimize mortality and injury severity of passengers in a traffic (collision) accident of a vehicle, particularly, a passenger vehicle, is a core design technology of vehicle development and production of passenger vehicles. The design of a collision safety deformation structure of a vehicle body structure is the basis for improving the collision safety performance of vehicles. To meet the increasingly high requirement of the public on the collision safety of family passenger vehicles, in recent years, related departments of countries continuously and gradually improve and add some test conditions of the collision safety performance of passenger vehicles in domestic related regulations and evaluation criteria. For example, the United States has updated a series of regulations and evaluation criteria related to the safety collision performance for vehicles sold in the domestic market, which requires the passenger compartment of the vehicle body to bear a larger collision force and have a smaller deformation under more working conditions.

As the family passenger vehicles are widespread in the global market, environmental protection problems caused by the shortage and burning of fossil energy are increasingly severe. Therefore, countries are actively developing new energy vehicles. Electric vehicles are becoming a future trend as a direction of the new energy vehicles. In addition to meeting the conventional design, designing a longer endurance mileage for the electric vehicles needs to be taken into consideration, to contend with the conventional fuel vehicles.

To improve the endurance mileage, more storage batteries need to be equipped on an electric vehicle. In this way, compared with a fuel vehicle with a same specification, the weight of the electric vehicle is greatly increased, so that under a same test condition, kinetic energy of the vehicle in an early stage of a collision is increased. That is, a vehicle body structure of the electric vehicle needs to be bear larger forces and absorb more kinetic energy to improve the safety. Further, because a storage battery pack needs to be disposed in the electric vehicle, much space under the vehicle body is occupied, and various classic vehicle body collision safety structure technologies of the conventional fuel vehicles cannot be used. Therefore, a new vehicle body structure technology that can meet both the storage battery deployment and the vehicle safety needs to be designed.

SUMMARY

An objective of the present disclosure is to provide a vehicle body structure that can better protect a battery pack when a rear collision occurs to a vehicle.

To achieve the foregoing objective, the present disclosure provides a vehicle body structure of an electric vehicle. The electric vehicle includes a battery pack and a motor. The vehicle body structure includes a floor panel and a battery pack anti-collision structure, where the battery pack and the motor are disposed below the floor panel, the motor is located behind the battery pack, and the battery pack anti-collision structure is disposed between the battery pack and the motor, and is configured to prevent the motor from crashing into the battery pack when a rear collision occurs to the electric vehicle.

Through the foregoing technical solutions, when a rear collision occurs to the vehicle and causes the motor to move forward, the battery pack anti-collision structure can change a moving track of the motor to some extent, so that the motor moves downward to avoid the battery pack in front of the motor, thereby preventing the battery pack from being crashed or extruded, preventing the battery pack from catching fire or exploding, and improving the collision safety performance of the vehicle.

The present disclosure further provides an electric vehicle including the foregoing vehicle body structure.

Other features and advantages of the present disclosure are described in detail in the following detailed implementations.

BRIEF DESCRIPTION OF THE DRAWINGS

The accompanying drawings are used to provide a further understanding of the present disclosure, constitute a part of this specification, and are used, together with the following specific implementations, to explain the present disclosure, but do not constitute limitations to the present disclosure. In the accompanying drawings.

DETAILED DESCRIPTION

Specific implementations of the present disclosure are described in detail below with reference to the accompanying drawings. It should be understood that the specific implementations described herein are merely used to describe and explain the present disclosure rather than limiting the present disclosure.

In the present disclosure, unless specified otherwise, location words used such as "up", "down", "left", "right", "front" and "rear" are defined on the basis of an up-and-down direction, a left-and-right direction and a front-and-rear direction of a vehicle. Specifically, in the drawings, an X direction is the front-and-rear direction of the vehicle, that is, a longitudinal direction of the vehicle, where one side pointed by an arrow is the "front", and the opposite is the "rear"; an Y direction is the left-and-right direction of the vehicle, that is, a lateral direction of the vehicle, where one side pointed by an arrow is "right", and the opposite is "left"; and a Z direction is the up-and-down direction of the vehicle, that is, a height direction of the vehicle, where one side pointed by an arrow is "up", and the opposite is "down". "Inner" and "outer" are defined on the basis of contours of corresponding components. For example, in-vehicle and out-vehicle are defined on the basis of a contour of a vehicle, where one side close to the middle of the vehicle is "inner", and the other side is "outer". The foregoing definitions are merely used to help describe the present disclosure, and should not be understood as a limitation to the present disclosure.

All "crossbeams" in the present disclosure refer to beams generally extending along the left-and-right direction of the vehicle, and all "longitudinal beams" refer to beams generally extending along the front-and-rear direction of the vehicle. In addition, unless specified otherwise, meanings of nouns such as "floor panel", "rear longitudinal beam" and "rear anti-collision crossbeam" involved in the implementations of the present disclosure are meanings known in the art.

In addition, unless clearly specified or limited otherwise, terms such as "connect", "attach" and "fix" should be understood broadly, and may be implemented in non-removable manners such as welding, removable manners such as bolting, or integrally forming manners such as molding.

A vehicle body structure of an electric vehicle according to embodiments of the present disclosure is described with reference to FIG. 1 to FIG. 16 as follows.

Figure 3:
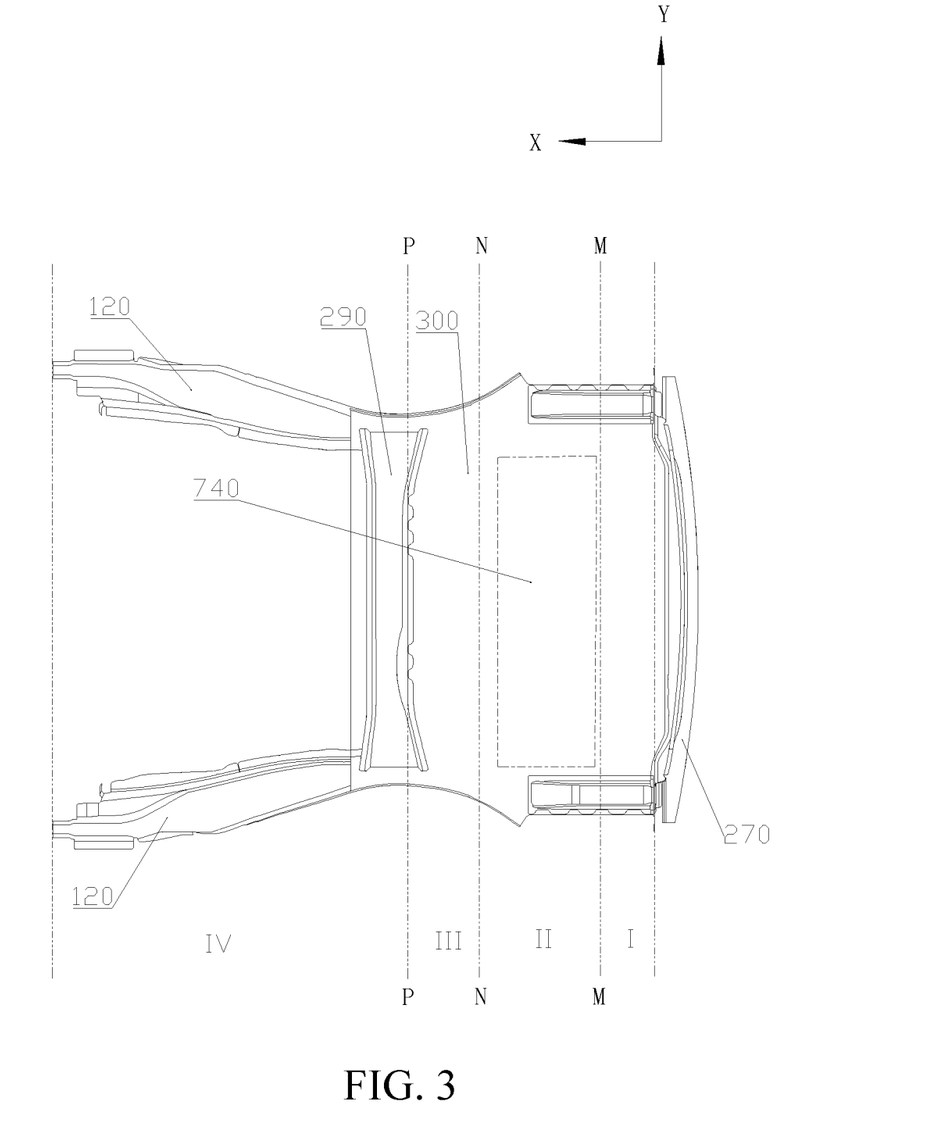
FIG. 3 is a top view of a vehicle body structure according to an implementation of the present disclosure.
Figure 4:
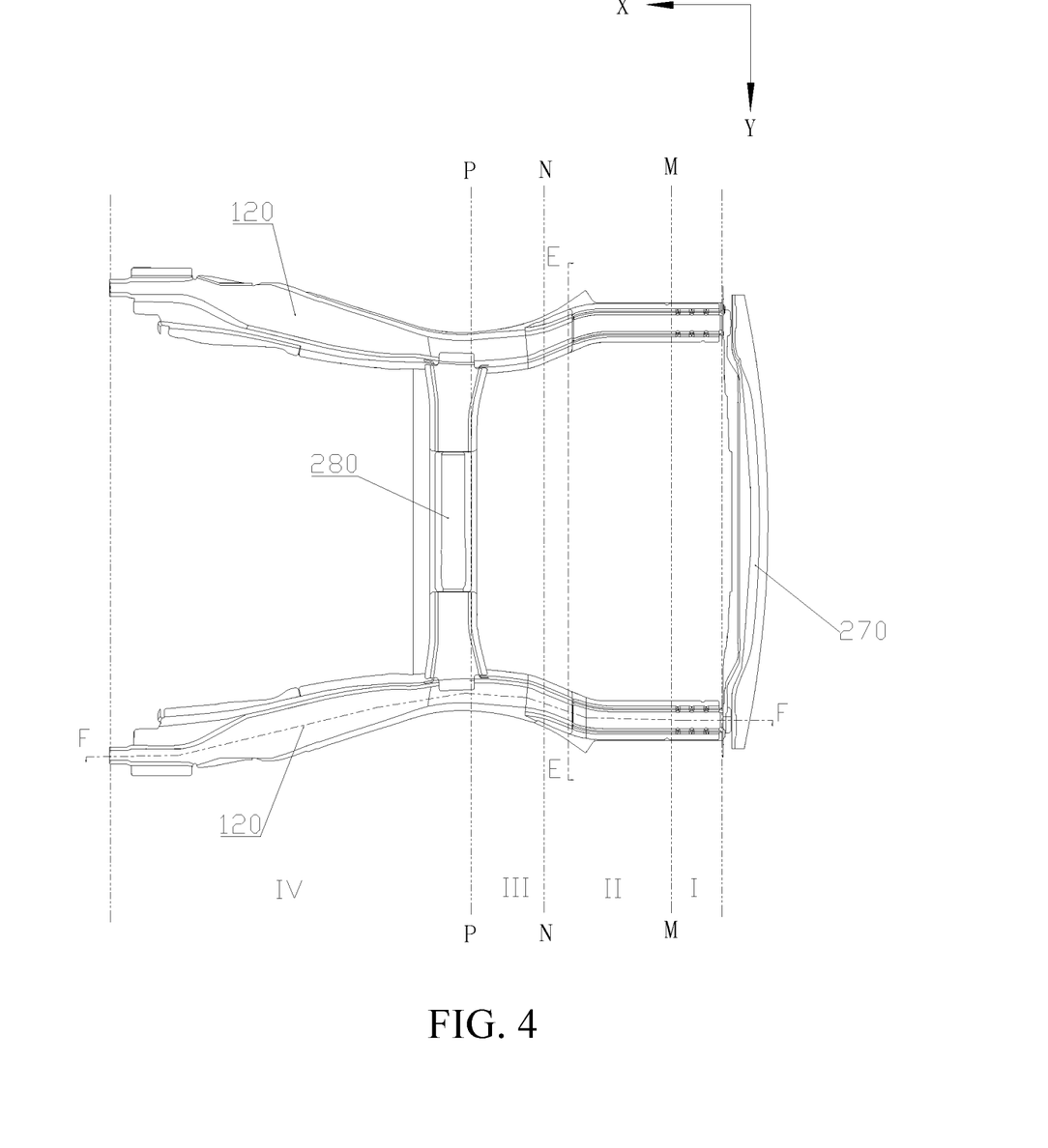
FIG. 4 is a bottom view of a vehicle body structure according to an implementation of the present disclosure.
Figure 5:
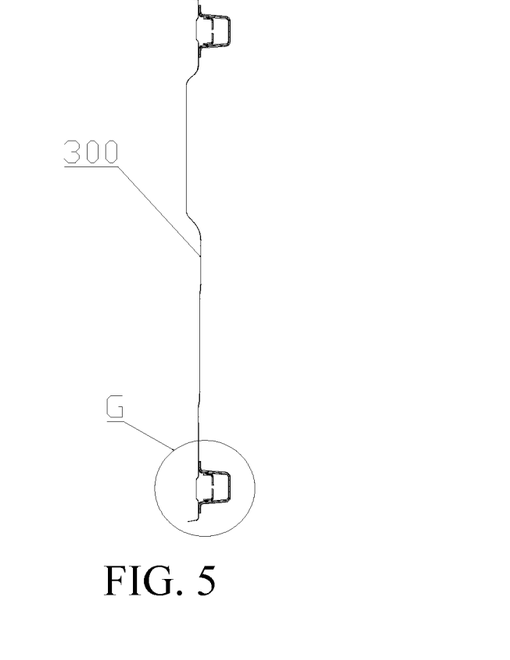
FIG. 5 is a sectional view of E-E in FIG. 4.

According to an aspect of the present disclosure, a vehicle body structure is provided. As shown in FIG. 3 and FIG. 4, the vehicle body structure includes a rear anti-collision crossbeam 270, a floor panel 300 and two rear longitudinal beams 120 disposed at intervals along a left-and-right direction. Two ends of the rear anti-collision crossbeam 270 respectively correspond to rear ends of the two rear longitudinal beams 120. The floor panel 300 has an electric control device mounting region for mounting an electric control device 740 and a rear seat mounting region for mounting a rear seat (not shown). The electric control device mounting region is located behind the rear seat mounting region and is separated from the rear seat mounting region. The electric control device 740 may be configured to control to electrify or cut off a battery pack. The rear longitudinal beam 120 may sequentially include a first segment I, a second segment II, a third segment III and a fourth segment IV from back to front. The second segment II corresponds to the electric control device mounting region of the floor panel 300 in a lateral direction of the vehicle, that is, corresponds to the electric control device 740 in the lateral direction of the vehicle. That is, a distance between the electric control device 740 and a front end of the vehicle is basically equal to a distance between the second segment II and the front end of the vehicle. The strength of the second segment II is greater than that of the first segment I and that of the third segment III.

In the vehicle body structure of the present disclosure, because the strength of the second segment II is greater than that of the first segment I and that of the third segment III, when a rear collision occurs to the vehicle, compared with the first segment I and the third segment III, the second segment II deforms later or does not deform (when the collision force is relatively small), so that the electric control device 740 laterally corresponding to the second segment II deforms later or does not deform to protect the electric control device 740. In this way, the electric control device 740 is provided with enough time to cut off a battery pack 600, thereby preventing the battery pack 600 from dangers such as catching fire or even exploding when the battery pack 600 is extruded.

In an implementation, the strength of the third segment III may be greater than that of the first segment I, that is, the strength of the first segment I is the least, the strength of the third segment III is second least, and the strength of the second segment II is the greatest. In this case, when a rear collision occurs to the vehicle, if the collision force is relatively small, only the first segment I deforms; if the collision force is relatively great, the first segment I deforms first, and then the third segment III deforms; and if the collision force is excessively great, the first segment I deforms first, then the third segment III deforms, and finally the second segment II deforms.

In some embodiments, a division surface P-P of the third segment III and the fourth segment IV may be located behind the rear seat mounting region of the floor panel 300, that is, the rear seat is located in a range corresponding to the fourth segment IV in the lateral direction of the vehicle, and the strength of the fourth segment IV may be greater than that of the third segment III. Further, the strength of the fourth segment IV may be greater than that of the second segment II. By designing the fourth segment IV with relatively great strength, when a rear collision occurs to the vehicle, the fourth segment IV does not deform easily, so that the safety of rear-seat passengers is ensured. Meanwhile, by connecting a rear seat mounting crossbeam in the fourth segment IV, the strength of the fourth segment IV is improved.

In some embodiments, the vehicle body structure may further include a battery pack rear mounting crossbeam 230 (shown in FIG. 12), the battery pack 600 is disposed below the floor panel 300 and located in front of the motor 730, and the motor 730 may be mounted on the rear longitudinal beams 120 through a subframe (not shown). The battery pack rear mounting crossbeam 230 is disposed below the floor panel 300, two ends of the battery pack rear mounting crossbeam 230 are respectively connected to the rear longitudinal beams 120 on a left side and a right side. Two battery tray mounting brackets 340 are disposed at intervals on the battery pack rear mounting crossbeam 230 along the left-and-right direction and extend downward from the battery pack rear mounting crossbeam 230. A rear end of a battery tray of the battery pack 600 is mounted on the two battery tray mounting brackets 340.

The division surface P-P of the third segment III and the fourth segment IV may be located behind the battery pack rear mounting crossbeam 230, that is, the battery pack rear mounting crossbeam 230 is connected to the fourth segment IV of the rear longitudinal beam 120. By designing the fourth segment IV with relatively great strength, when a rear collision occurs to the vehicle, the fourth segment IV does not deform easily, so that the safety of the battery pack is ensured. Meanwhile, by connecting an under-floor crossbeam 280 in the fourth segment IV, the strength of the fourth segment IV is improved.

Figure 1:
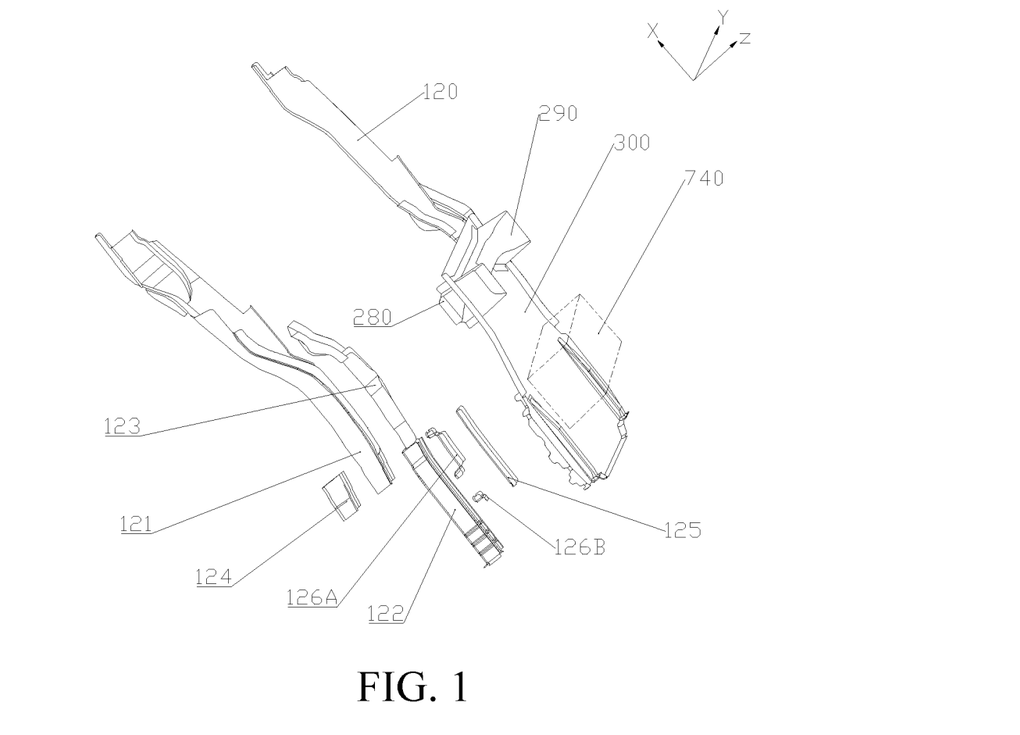
FIG. 1 is an exploded partial view of a vehicle body structure according to an implementation of the present disclosure.

In some embodiments, as shown in FIG. 1 and FIG. 4, the vehicle body structure may further include the under-floor crossbeam 280 disposed on a lower surface of the floor panel 300 and located behind a rear-floor crossbeam. Two ends of the under-floor crossbeam 280 are respectively and correspondingly connected to the rear longitudinal beams 120 on a left side and a right side. As a beam that forms a vehicle body frame, the under-floor crossbeam 280 can improve the strength and rigidity of the vehicle body. The under-floor crossbeam 280 may be disposed in a concave point of the rear longitudinal beam 120, to prevent the bending or deformation in the concave point.

In an implementation, as shown in FIG. 4, a rear edge of the under-floor crossbeam 280 may be located on the division surface P-P of the third segment III and the fourth segment IV. That is, the under-floor crossbeam 280 in connected to a rear end of the fourth segment IV. By connecting to the under-floor crossbeam 280, the strength of the fourth segment IV is improved.

As shown in FIG. 1 and FIG. 3, a floor up beam 290 corresponding to the under-floor crossbeam 280 in the position is further disposed above the floor panel 300, and the floor up beam 290, the floor panel 300 and the under-floor crossbeam 280 are connected. In this case, the third segment III may correspond to a region of the floor panel 300 in the lateral direction of the vehicle, where the region is located between the floor up beam 290 and the electric control device mounting region.

The battery pack rear mounting crossbeam 230, the under-floor crossbeam 280 and the two rear longitudinal beams 120 form a closed-loop frame structure. The closed-loop frame structure can increase the strength of the vehicle body structure and improve the stability of the vehicle body structure. When a side collision occurs to the vehicle, the battery pack rear mounting crossbeam 230 and the under-floor crossbeam 280 can directly transfer the collision force from the rear longitudinal beam 120 on one side to the rear longitudinal beam 120 on the other side, so that the floor panel 300 basically does not participate in or rarely participates in the collision force transferring and force absorption, thereby limiting and reducing lateral deformations of the floor panel 300 and the rear longitudinal beams 120.

In the present disclosure, the rear longitudinal beam 120 may have any proper structure, as long as strength relationships between segments meet the foregoing requirement.

In an implementation, as shown in FIG. 1, the rear longitudinal beam 120 may include a rear longitudinal beam front segment 121 and a rear longitudinal beam rear segment 122 connected to each other. The under-floor crossbeam 280 and the rear-floor crossbeam 230 may be connected to the rear longitudinal beam front segment 121. A rear longitudinal beam rear segment strengthening structure and a rear longitudinal beam rear segment weakening structure are disposed in the rear longitudinal beam rear segment 122. The rear longitudinal beam rear segment weakening structure is located in the first segment I and the rear longitudinal beam rear segment strengthening structure is located in the second segment II.

Figure 2:
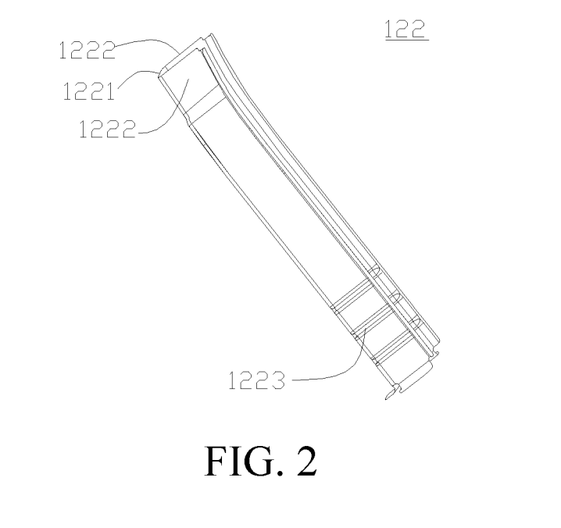
FIG. 2 is a three-dimensional view of a rear longitudinal beam rear segment in a vehicle body structure according to an implementation of the present disclosure.

As shown in FIG. 2, the rear longitudinal beam rear segment weakening structure may be a crumpling rib 1223 and/or a crumpling hole disposed in the rear longitudinal beam rear segment 122.

As shown in FIG. 2, a cross section of the rear longitudinal beam rear segment 122 is a grooved structure with an opening upward, and the rear longitudinal beam rear segment 122 includes a rear segment bottom wall 1221 and two rear segment side walls 1222. The two side walls 1222 are disposed opposite to each other. The rear segment bottom wall 1221 is connected to the two rear segment side walls 1222.

Figure 6:
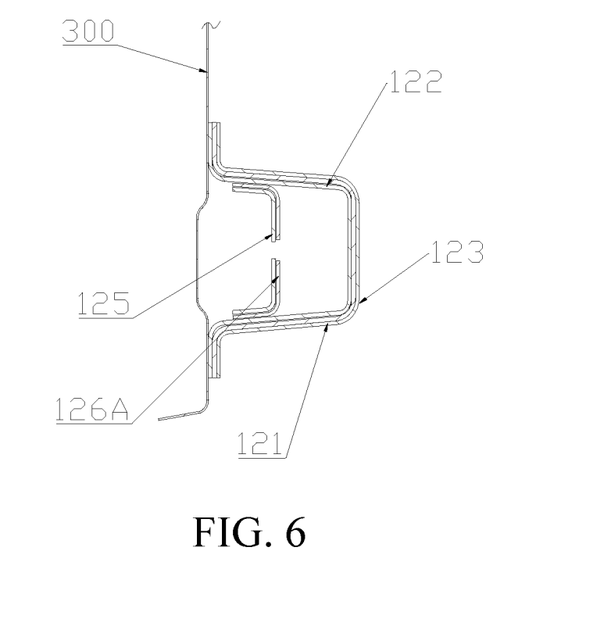
FIG. 6 is an enlarged view of a G part in FIG. 5.
Figure 7:
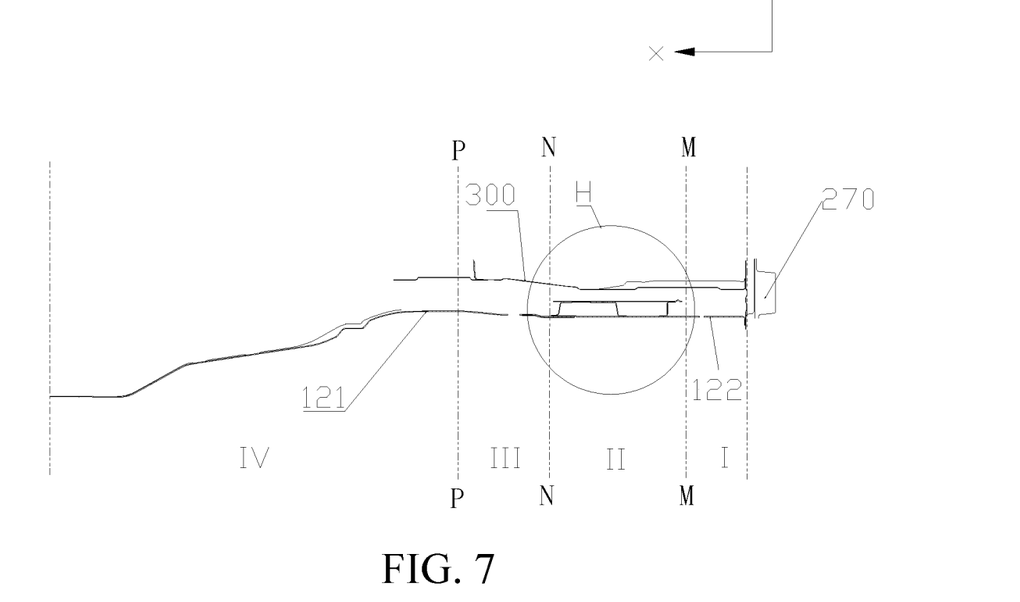
FIG. 7 is a sectional view of F-F in FIG. 4.
Figure 8:
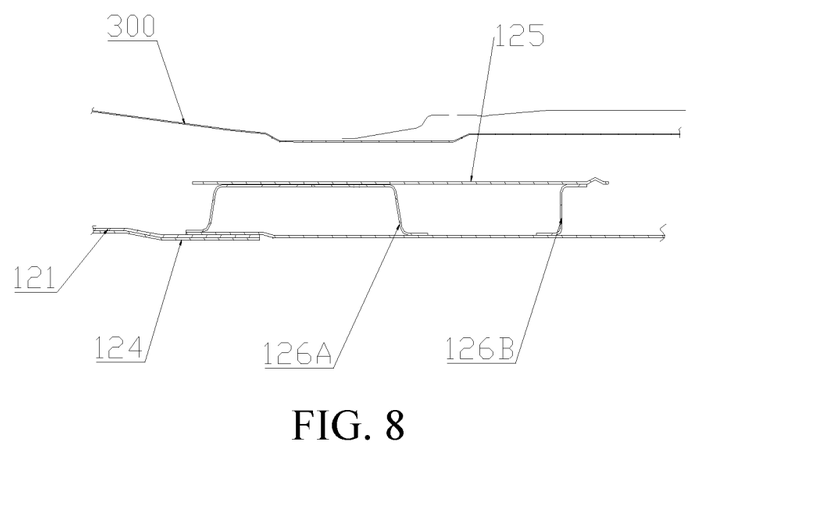
FIG. 8 is an enlarged view of an H part in FIG. 7.

As shown in FIG. 1, FIG. 6 and FIG. 7, the rear longitudinal beam rear segment strengthening structure may include a rear longitudinal beam rear segment strengthening plate 125 disposed in the rear longitudinal beam rear segment 122. A front end of the rear longitudinal beam rear segment strengthening plate 125 extends to a division surface M-M of the second segment II and the first segment I, and a rear end of the rear longitudinal beam rear segment strengthening plate 125 extends to a division surface N-N of the second segment II and the third segment III. By disposing the rear longitudinal beam rear segment strengthening plate 125, the second segment II can be strengthened.

The rear longitudinal beam rear segment strengthening plate 125 may be directly laminated on the rear segment bottom wall 1221. In an implementation, as shown in FIG. 7, the rear longitudinal beam rear segment strengthening plate 125 may be disposed with the rear segment bottom wall 1221 at intervals. The rear longitudinal beam rear segment strengthening structure may further include a rear longitudinal beam rear segment support plate 126A and a rear longitudinal beam rear segment support plate 126B supported between the rear segment bottom wall 1221 and the rear longitudinal beam rear segment strengthening plate 125. The rear longitudinal beam rear segment strengthening plate is connected to the rear longitudinal beam rear segment 122 through the rear longitudinal beam rear segment support plate 126A and the rear longitudinal beam rear segment support plate 126B. The rear longitudinal beam rear segment support plate 126A and the rear longitudinal beam rear segment support plate 126B may be one or more. In the implementation shown in the drawing, the rear longitudinal beam rear segment support plate 126A and the rear longitudinal beam rear segment support plate 126B include a front support plate and a rear support plate. The front support plate is trapezoidal, and is configured to support the front and the middle of the rear longitudinal beam rear segment strengthening plate 125; and the rear support plate is Z-shaped, and is configured to support the rear of the rear longitudinal beam rear segment strengthening plate 125.

In an implementation, a front end of the rear longitudinal beam rear segment 122 may extend to the division surface N-N of the second segment II and the third segment III, that is, the front end of the rear longitudinal beam rear segment 122 is flush with the front end of the rear longitudinal beam rear segment strengthening plate 125, and the length of the rear longitudinal beam rear segment 122 is equal to the sum of the length of the first segment I and the length of the second segment II.

A rear longitudinal beam front segment rear strengthening plate 124 may be disposed in the rear longitudinal beam front segment 121, and the rear longitudinal beam front segment rear strengthening plate 124 may be disposed at a junction of the rear longitudinal beam front segment 121 and the rear longitudinal beam rear segment 122. By disposing the rear longitudinal beam front segment rear strengthening plate 124, the strength of the junction of the rear longitudinal beam front segment 121 and the rear longitudinal beam rear segment 122 can be improved, thereby preventing the junction of the rear longitudinal beam front segment 121 and the rear longitudinal beam rear segment 122 from failing or deforming, which helps transfer the collision force backward or forward when a front collision or a rear collision occurs to the vehicle, and improves the collision safety of the vehicle.

Further, a rear longitudinal beam front segment middle strengthening plate 123 may be further disposed in the rear longitudinal beam front segment 121. One part of the rear longitudinal beam front segment middle strengthening plate 123 may be located in the third segment III, and the other part may be located in the fourth segment IV. By disposing the rear longitudinal beam front segment middle strengthening plate 123, the entire third segment III and a part of the fourth segment IV can be strengthened, so that the strength of the third segment III is greater than that of the first segment I, thereby facilitating to control a crushing sequence of the segments of the rear longitudinal beam when a rear collision occurs.

In an implementation, a cross-sectional area of the fourth segment IV may be greater than those of other segments, so that the strength of the fourth segment IV is greater than that of other segments. In another implementation, a strengthening structure (for example, a strengthening plate or a strengthening rib) may be disposed in the fourth segment IV, to improve the strength of the fourth segment IV to be greater than that of other segments.

Figure 9:
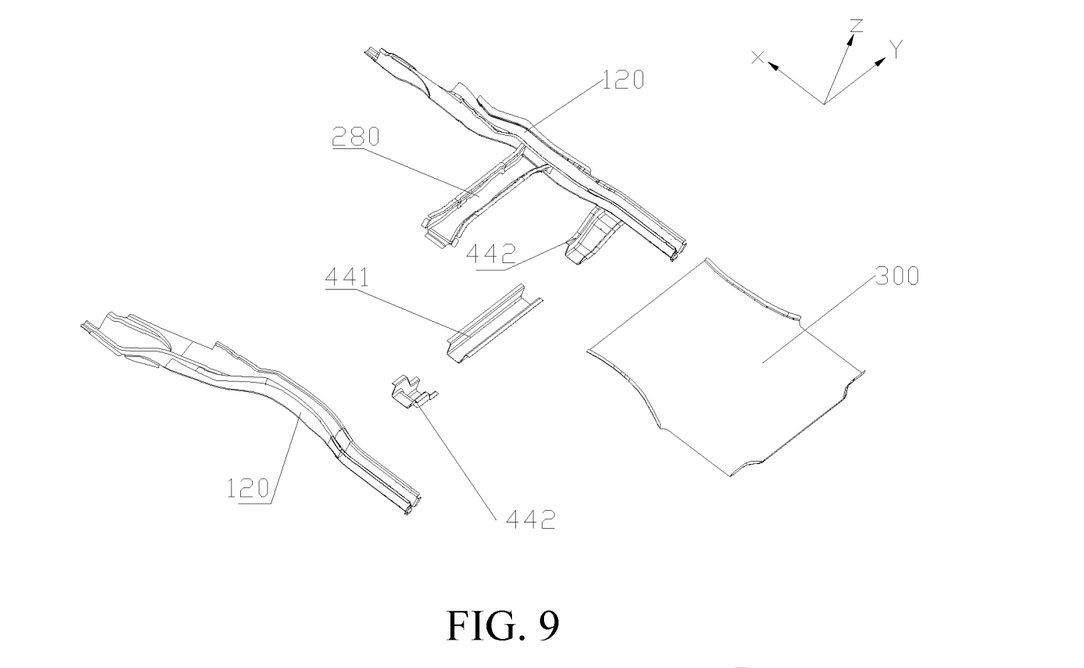
FIG. 9 is an exploded partial view of a vehicle body structure according to an implementation of the present disclosure.
Figure 10:
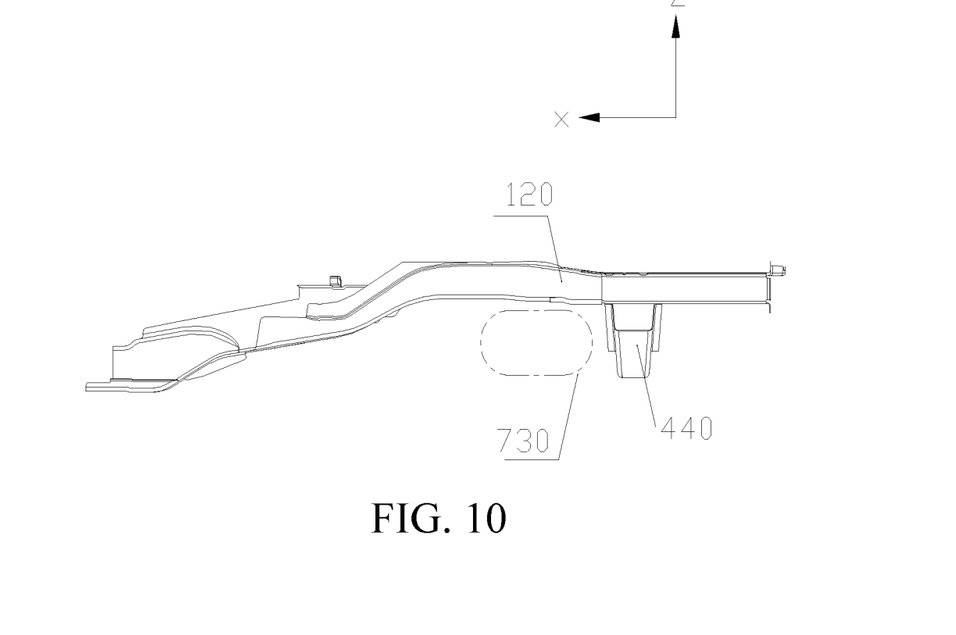
FIG. 10 is a side view of a vehicle body structure according to an implementation of the present disclosure.

To protect the motor 730 when a rear collision occurs to the vehicle or the vehicle is reversing, in an implementation, as shown in FIG. 9 and FIG. 10, the vehicle body structure may further include a motor anti-collision beam 440. Two ends of the motor anti-collision beam 440 are respectively and correspondingly connected to the two rear longitudinal beams 120, and the motor anti-collision beam 440 is at least partially lower than the rear longitudinal beam 120, that is, at least a part of the motor anti-collision beam 440 is located below the rear longitudinal beam 120. The motor anti-collision beam 400 is located below the floor panel 300 and behind the motor 730.

By disposed the motor anti-collision beam 440 behind the motor 730, on one hand, when a rear collision occurs, the motor anti-collision beam 440 can prevent a vehicle behind from directly crashing into the motor 730, to effectively protect the motor 730; and on the other hand, when the vehicle is reversing, the motor anti-collision beam 440 can protect the motor 730 from being damaged by a ground obstacle (for example, a curb or a ground stud), and further protect the motor 730.

Because the two ends of the motor anti-collision beam 440 are respectively and correspondingly connected to the two rear longitudinal beams 120 on the left and the right, when a side collision occurs to the vehicle, the motor anti-collision beam 440 can form a lateral support between the two rear longitudinal beams 120, and reduce lateral deformations of the rear longitudinal beams 120 and the floor panel 300.

The two ends of the motor anti-collision beam 440 may be connected to any proper position of the rear longitudinal beams 120. In an implementation, the two ends of the motor anti-collision beam 440 may be connected to the second segment II of the rear longitudinal beam 120, that is, the motor anti-collision beam 440 may be disposed just below the electric control device 740. In this way, the strength of the second segment II can be improved.

Figure 11:
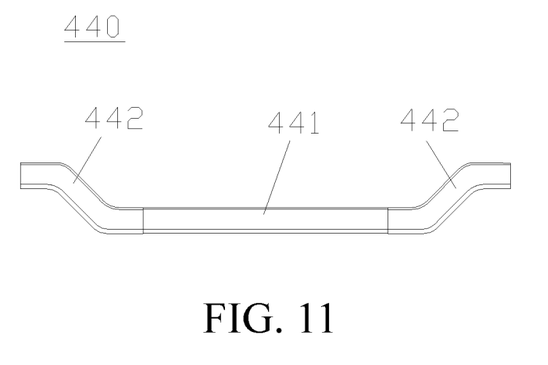
FIG. 11 is a front view of a motor anti-collision beam in a vehicle body structure according to an implementation of the present disclosure.

The motor anti-collision beam 440 may have any proper structure and shape. In an implementation, as shown in FIG. 11, the motor anti-collision beam 440 may include a main body segment 441 and two connection segments 442. The main body segment 441 extends horizontally, and each connection segment 442 generally extends obliquely upward from one end of the main body segment 441 to connect to the rear longitudinal beam 120. Specifically, as shown in FIG. 3, the main body segment 441 may be in a shape of a line type, and the connection segments 442 may be generally Z-shaped. In this way, the height of the motor anti-collision beam 440 is relatively small, so that the motor 730 is better protected. In an implementation, a lowest point of the motor anti-collision beam 440 may be lower than that of the motor 730, to better prevent the ground obstacle from damaging the motor 730.

To prevent the motor 730 from moving forward and crashing into the battery pack 600 when a rear collision occurs to the vehicle, in an implementation, a battery pack anti-collision structure is disposed between the battery pack 600 and the motor 730. The battery pack anti-collision structure is configured to prevent the motor 730 from crashing into the battery pack 600 when a rear collision occurs to the vehicle. That is, when a rear collision occurs to the vehicle and causes the motor 730 to move forward (including moving forward because the rear longitudinal beam 120 deforms and moving forward because a vehicle behind directly crashes into the motor 730), the battery pack anti-collision structure can change a moving track of the motor 730 to some extent, so that the motor 730 does not crash into the battery pack 600.

The battery pack anti-collision structure may have any proper structure. In an implementation, the battery pack anti-collision structure may include a guide beam 450 or a guide plate disposed obliquely along the front-and-rear direction. The guide beam 450 or the guide plate extends forward and downward. When a rear collision occurs to the vehicle and causes the motor 730 to move forward, the motor 730 crashes into the guide beam 450 or the guide plate, and the guide beam 450 or the guide plate guides the motor 730 to move forward and downward at the same time to avoid the battery pack 600. That is, when a rear collision occurs to the vehicle and causes the motor 730 to move forward, the battery pack anti-collision structure can change the moving track of the motor 730 to some extent, so that the motor 730 moves downward to avoid the battery pack 600 in front of the motor 730, thereby preventing the battery pack 600 from being crashed or extruded.

Figure 12:
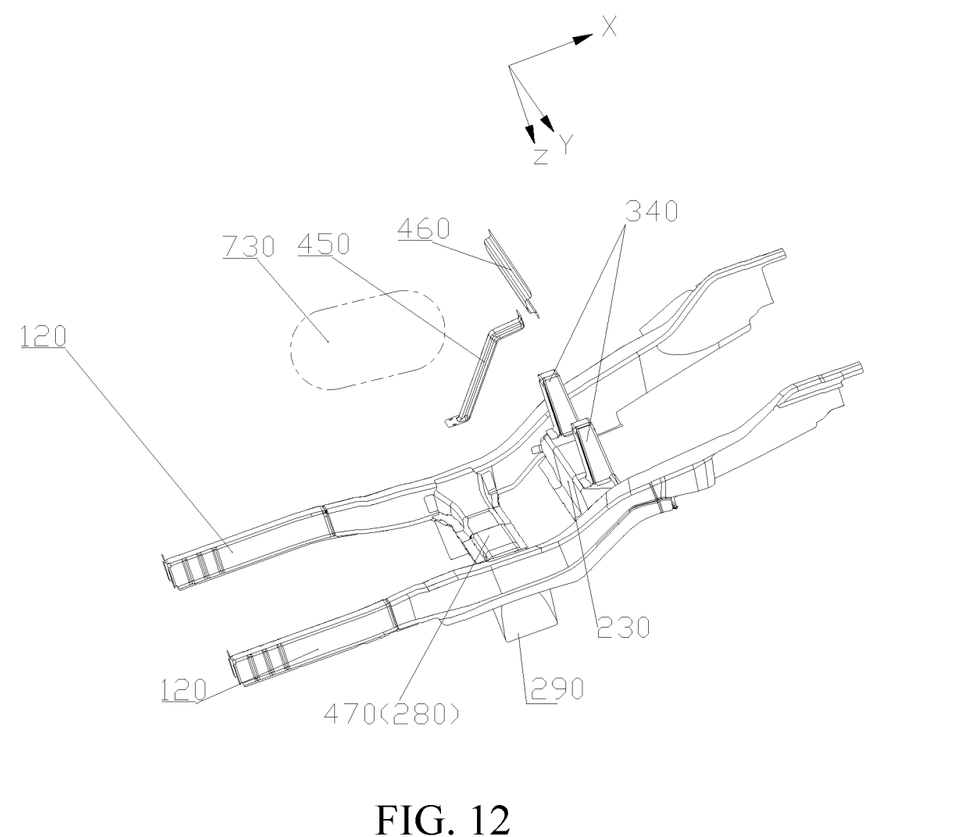
FIG. 12 is a three-dimensional view of a vehicle body structure according to an implementation of the present disclosure.
Figure 13:
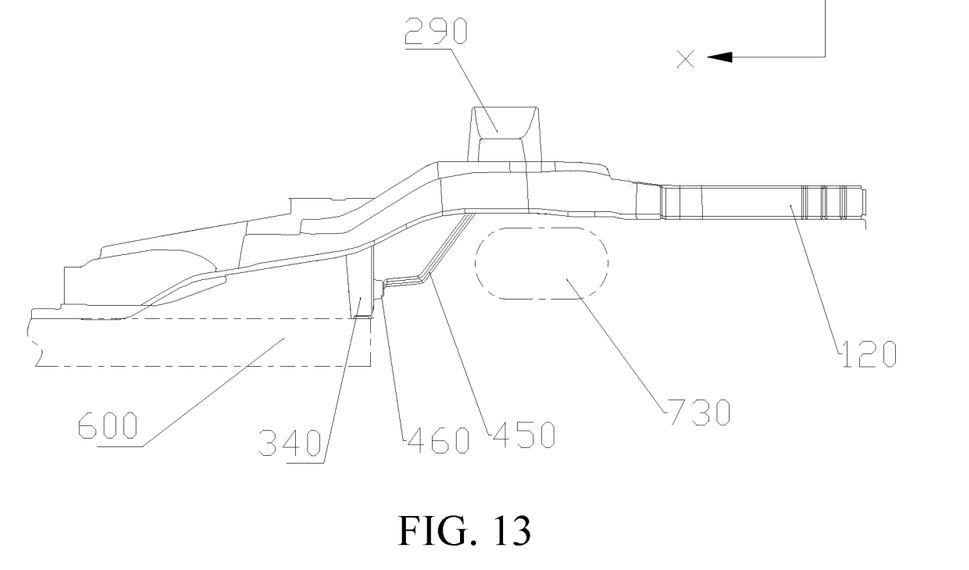
FIG. 13 is a side view of a vehicle body structure according to an implementation of the present disclosure.
Figure 14:
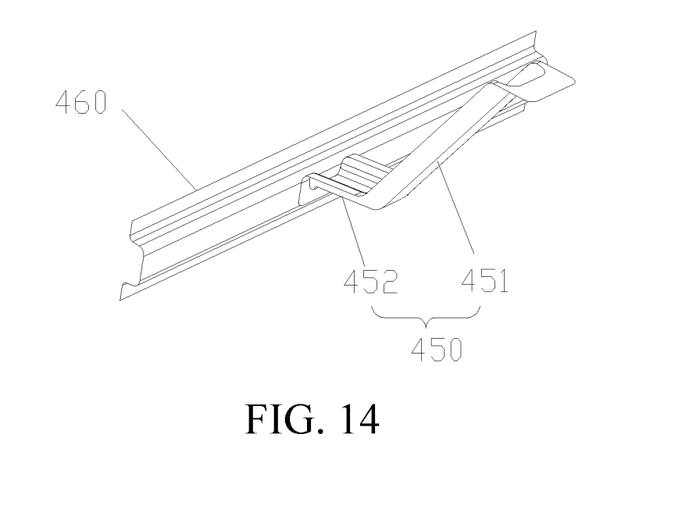
FIG. 14 is a three-dimensional view of a guide beam and a front mounting crossbeam in a vehicle body structure according to an implementation of the present disclosure.

The guide beam 450 or the guide plate may be mounted on the rear longitudinal beam 120 in various manners. In an implementation, as shown in FIG. 12 to FIG. 14, in addition to the guide beam 450, the battery pack anti-collision structure may further include a front mounting crossbeam 460 and a rear mounting crossbeam 470. The front mounting crossbeam 460 is connected to the two battery tray mounting brackets 340, two ends of the rear mounting crossbeam 470 are connected to the rear longitudinal beams 120, a front end of the guide beam 450 is connected to the front mounting crossbeam 460, and a rear end of the guide beam 450 is connected to the rear mounting crossbeam 470. In this way, the position of the front mounting crossbeam 460 is lower than that of the rear mounting crossbeam 470, so that the guide beam 450 is disposed obliquely. When the motor 730 crashes into the guide beam 450, the guide beam 450 absorbs a part of energy, transfers a part of energy to the rear longitudinal beam 120 through the rear mounting crossbeam 470, and transfers another part of energy to the rear longitudinal beam 120 through the front mounting crossbeam 460, the battery tray mounting bracket 340 and the rear-floor crossbeam 230. In this implementation, the battery pack anti-collision structure forms an H-shaped structure connected between the two rear longitudinal beams 120, so as to further strengthen the vehicle body structure and improve the collision safety of the vehicle.

The guide beam 450 may be a flat and straight beam. Alternatively, as shown in FIG. 14, the guide beam 450 is a curved beam, and includes a first segment 451 and a second segment 452 connected to the first segment 451. The first segment 451 extends forward and downward from the rear mounting crossbeam 470, and the second segment 452 generally extends forward horizontally from the first segment 451 to connect to the front mounting crossbeam 460. In this way, a distance between the guide beam 450 and the motor 730 is smaller, and the motor 730 can come into contact with the guide beam 450 earlier, which facilitates to control a moving direction of the motor 730.

Figure 15:
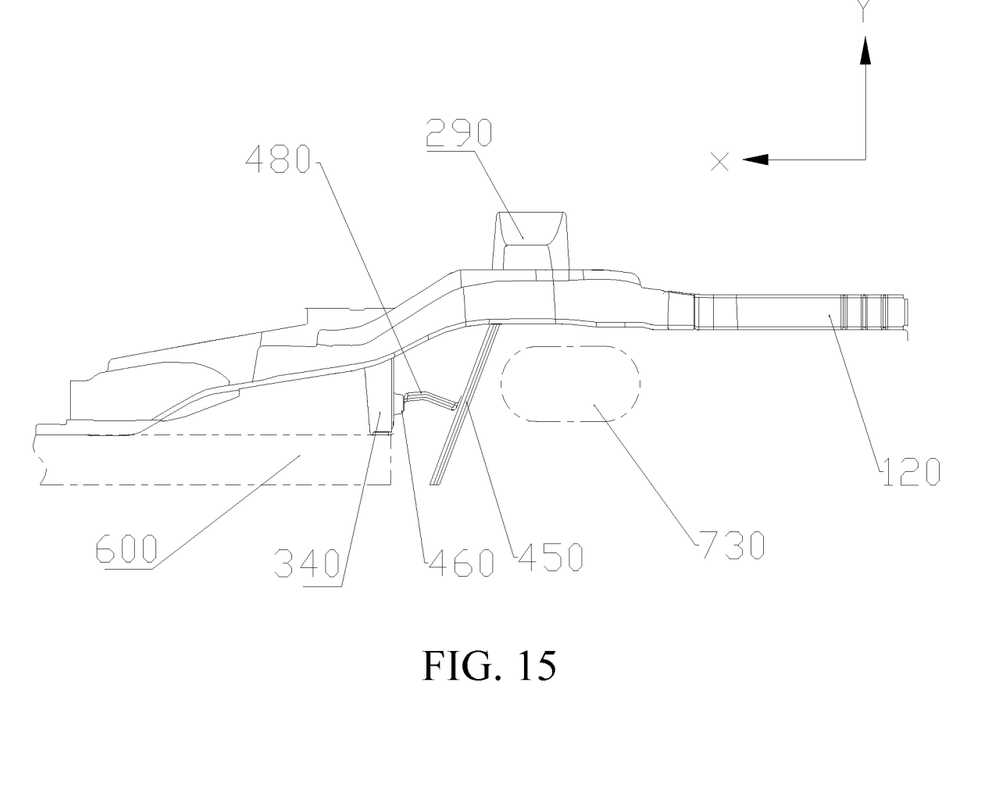
FIG. 15 is a side view of a vehicle body structure according to an implementation of the present disclosure.

In another implementation, as shown in FIG. 15, in addition to the guide beam 450, the battery pack anti-collision structure may further include a front mounting crossbeam 460, a rear mounting crossbeam 470 and a support beam 480. The front mounting crossbeam 460 is connected to the two battery tray mounting brackets 340, two ends of the rear mounting crossbeam 470 are connected to the rear longitudinal beams 120, a rear end of the guide beam 450 is connected to the rear mounting crossbeam 470, the support beam 480 generally extends along the front-and-rear direction, a front end of the support beam 480 is connected to the front mounting crossbeam 460, and a rear end of the support beam 480 is connected to the middle of the guide beam 450. When the motor 730 crashes into the guide beam 450, the guide beam 450 absorbs a part of energy, transfers a part of energy to the rear longitudinal beam 120 through the rear mounting crossbeam 470, and transfers another part of energy to the rear longitudinal beam 120 through the support beam 480, the front mounting crossbeam 460, the battery tray mounting bracket 340 and the battery pack rear mounting crossbeam 230. In this implementation, a position of a lower end of the guide beam 450 may be lower (for example, being flush with a lower surface of the battery pack or lower than a lower surface of the battery pack), which further eliminates a risk that the motor 730 crashes into the battery pack 600.

Figure 16:
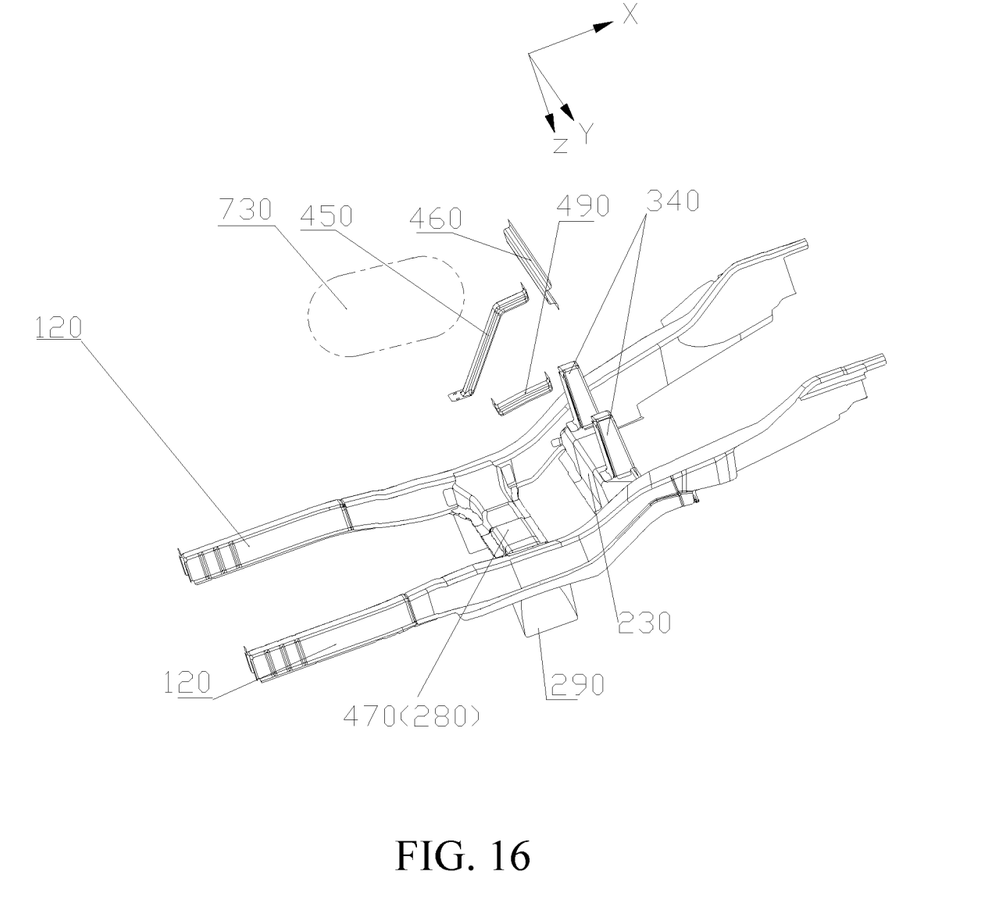
FIG. 16 is an exploded partial view of a vehicle body structure according to an implementation of the present disclosure.

In still another implementation, as shown in FIG. 16, in addition to the guide beam 450, the battery pack anti-collision structure further includes a front mounting crossbeam 460, a rear mounting crossbeam 470 and a mounting longitudinal beam 490. The front mounting crossbeam 460 is connected to the two battery tray mounting brackets 340, two ends of the rear mounting crossbeam 470 are connected to the rear longitudinal beams 120, a front end of the mounting longitudinal beam 490 is connected to the battery pack rear mounting crossbeam 230, a rear end of the mounting longitudinal beam 490 is connected to the rear mounting crossbeam 470, a front end of the guide beam 450 is connected to the front mounting crossbeam 460, a rear end of the guide beam 450 is connected to the middle of the mounting longitudinal beam 490, and a projection of the guide beam 450 on the floor panel 300 overlaps a projection of the mounting longitudinal beam 490 on the floor panel 300. When the motor 730 crashes into the guide beam 450, the guide beam 450 absorbs a part of energy, transfers a part of energy to the rear longitudinal beam 120 and the battery pack rear mounting crossbeam 230 through the mounting longitudinal beam 490, and transfers another part of energy to the rear longitudinal beam 120 through the front mounting crossbeam 460, the battery tray mounting bracket 340 and the battery pack rear mounting crossbeam 230. In this implementation, in one aspect, the battery pack rear mounting crossbeam 230, the mounting longitudinal beam 490 and the rear mounting crossbeam 470 form an H-shaped structure, which can strengthen the vehicle body structure and improve the collision safety of the vehicle; and in another aspect, an included angle between the guide beam 450 and the mounting longitudinal beam 490 can further strengthen the vehicle body structure and improve the stability of the vehicle body structure.

The rear mounting crossbeam 470 herein may be a beam inherent in the vehicle body structure, or may be a beam disposed separately to mount the guide beam. In an implementation, the rear mounting crossbeam 470 may be, for example, the under-floor crossbeam 280 described above.

Different from the foregoing implementations that the guide beam or the guide plate guides the motor 730 to move, in an alternative implementation, the battery pack anti-collision structure may include a stopping crossbeam or a stopping plate. The stopping crossbeam or the stopping plate is connected to the rear longitudinal beam 120 and disposed between the battery pack 600 and the motor 730, and is configured to stop the motor 730 from moving forward when a rear collision occurs to the electric vehicle. The stopping crossbeam may be generally U-shaped.

On the basis of the foregoing technical solutions, the present disclosure further provides a vehicle. The vehicle includes the vehicle body structure provided by the present disclosure. Therefore, the vehicle includes all the advantages and beneficial effects of the vehicle body structure provided by the present disclosure. To reduce unnecessary repetitions, no description is provided herein again. Specifically, the vehicle may be an electric vehicle, so that the vehicle body structure adapts to the mounting of the battery pack.

Although specific implementations of the present disclosure are described in detail above with reference to the accompanying drawings, the present disclosure is not limited to specific details in the foregoing implementations. Various simple variations can be made to the technical solutions of the present disclosure within the scope of the technical idea of the present disclosure, and such simple variations all fall within the protection scope of the present disclosure.

It should be further noted that the specific technical features described in the foregoing specific implementations can be combined in any appropriate manner provided that no conflict occurs. To avoid unnecessary repetition, various possible combination manners are not further described in the present disclosure.

In addition, various different implementations of the present disclosure may alternatively be combined randomly. Such combinations should also be considered as the content disclosed in the present disclosure provided that these combinations do not depart from the concept of the present disclosure.

What is claimed is:

1. A vehicle body structure of an electric vehicle, the electric vehicle comprising a battery pack (600) and a motor (730), wherein the vehicle body structure comprises:
a floor panel (300), wherein the battery pack (600) and the motor (730) are disposed below the floor panel (300) and the motor (730) is located behind the battery pack (600); and
a battery pack anti-collision structure, disposed between the battery pack (600) and the motor (730) and preventing the motor (730) from crashing into the battery pack (600) when a rear collision occurs to the electric vehicle,
wherein the vehicle body structure further comprises two rear longitudinal beams (120) disposed at intervals along a left-and-right direction, the rear longitudinal beams (120) are connected to a lower surface of the floor panel (300), and the motor (730) is mounted on the rear longitudinal beams (120) through a subframe,
wherein the battery pack anti-collision structure comprises a guide beam (450) or a guide plate disposed obliquely along a front-and-rear direction, and the guide beam (450) or the guide plate extends forward and downward, and guides the motor (730) to move downward to avoid the battery pack (600) when a rear collision occurs to the electric vehicle.

2. The vehicle body structure according to claim 1, wherein the vehicle body structure further comprises a battery pack rear mounting crossbeam (230) and two battery tray mounting brackets (340), two ends of the battery pack rear mounting crossbeam (230) are connected to the rear longitudinal beams (120), the two battery tray mounting brackets (340) are disposed on the battery pack rear mounting crossbeam (230) at intervals along the left-and-right direction and extend downward from the battery pack rear mounting crossbeam (230), and a rear end of the battery pack (600) is mounted on the two battery tray mounting brackets (340), and
the battery pack anti-collision structure further comprises a front mounting crossbeam (460) and a rear mounting crossbeam (470), the front mounting crossbeam (460) is connected to the two battery tray mounting brackets (340), two ends of the rear mounting crossbeam (470) are connected to the rear longitudinal beams (120), a front end of the guide beam (450) or the guide plate is connected to the front mounting crossbeam (460), and a rear end of the guide beam (450) or the guide plate is connected to the rear mounting crossbeam (470).

3. The vehicle body structure according to claim 1, wherein the vehicle body structure further comprises a battery pack rear mounting crossbeam (230) and two battery tray mounting brackets (340), two ends of the battery pack rear mounting crossbeam (230) are connected to the rear longitudinal beams (120), the two battery tray mounting brackets (340) are disposed on the battery pack rear mounting crossbeam (230) at intervals along the left-and-right direction and extend downward from the battery pack rear mounting crossbeam (230), and a rear end of the battery pack is mounted on the two battery tray mounting brackets (340), and
the battery pack anti-collision structure further comprises a front mounting crossbeam (460), a rear mounting crossbeam (470) and a support beam, the front mounting crossbeam (460) is connected to the two battery tray mounting brackets (340), two ends of the rear mounting crossbeam (470) are connected to the rear longitudinal beams (120), a rear end of the guide beam (450) or the guide plate is connected to the rear mounting crossbeam (470), a front end of the support beam (480) is connected to the front mounting crossbeam, and a rear end of the support beam (480) is connected to the middle of the guide beam (450) or the guide plate.

4. The vehicle body structure according to claim 1, wherein the vehicle body structure further comprises a battery pack rear mounting crossbeam (230) and two battery tray mounting brackets (340), two ends of the battery pack rear mounting crossbeam (230) are connected to the rear longitudinal beams (120), the two battery tray mounting brackets (340) are disposed on the battery pack rear mounting crossbeam (230) at intervals along the left-and-right direction and extend downward from the battery pack rear mounting crossbeam (230), and a rear end of the battery pack (600) is mounted on the two battery tray mounting brackets (340), and
the battery pack anti-collision structure further comprises a front mounting crossbeam (460), a rear mounting crossbeam (470) and a mounting longitudinal beam (490), the front mounting crossbeam (460) is connected to the two battery tray mounting brackets (340), two ends of the rear mounting crossbeam (470) are connected to the rear longitudinal beams (120), a front end of the mounting longitudinal beam (490) is connected to the battery pack rear mounting crossbeam (230), a rear end of the mounting longitudinal beam (490) is connected to the rear mounting crossbeam (470), a front end of the guide beam (450) or the guide plate is connected to the front mounting crossbeam (460), a rear end of the guide beam (450) or the guide plate is connected to the middle of the mounting longitudinal beam (490), and a projection of the guide beam (450) or the guide plate on the floor panel (300) partially overlaps a projection of the mounting longitudinal beam (490) on the floor panel (300).

5. The vehicle body structure according to claim 2, wherein the rear mounting crossbeam (470) is an under-floor crossbeam (280).

6. The vehicle body structure according to claim 1, wherein the battery pack anti-collision structure comprises a stopping crossbeam or a stopping plate, and the stopping crossbeam or the stopping plate is connected to the rear longitudinal beam (120), and stops the motor (730) from moving to the battery pack (600) when a rear collision occurs to the electric vehicle.

7. The vehicle body structure according to claim 6, wherein the stopping crossbeam is U-shaped, and two ends of the stopping crossbeam are respectively connected to the two rear longitudinal beams (120).

8. The vehicle body structure according to claim 1, wherein the electric vehicle further comprises an electric control device (740) mounted on the floor panel (300), the rear longitudinal beam (120) sequentially comprises a first segment, a second segment, a third segment and a fourth segment from back to front, the second segment corresponds to the electric control device (740) in a lateral direction of the vehicle, a strength of the second segment is greater than a strength of the first segment and a strength of the third segment, and two ends of a motor anti-collision beam (440) are connected to the second segment.

9. The vehicle body structure according to claim 8, wherein a strength of the fourth segment is greater than the strength of the first segment and the strength of the third segment, and the strength of the third segment is greater than the strength of the first segment.

10. The vehicle body structure according to claim 8, wherein the rear longitudinal beam (120) comprises a rear longitudinal beam front segment (121) and a rear longitudinal beam rear segment (122) connected to each other, a rear longitudinal beam rear segment strengthening structure and a rear longitudinal beam rear segment weakening structure are disposed in the rear longitudinal beam rear segment (122), the rear longitudinal beam rear segment weakening structure is located in the first segment, and the rear longitudinal beam rear segment strengthening structure is located in the second segment.

11. The vehicle body structure according to claim 10, wherein the rear longitudinal beam rear segment weakening structure comprises a crumpling rib (1223) or a crumpling hole.

12. The vehicle body structure according to claim 10, wherein the rear longitudinal beam rear segment (122) forms a grooved structure with an opening upward, and comprises a rear segment bottom wall (1221) and two rear segment side walls (1222) disposed opposite to each other, the rear longitudinal beam rear segment strengthening structure comprises a rear longitudinal beam rear segment strengthening plate (125) and a rear longitudinal beam rear segment support plate (126A, 126B), the rear longitudinal beam rear segment strengthening plate (125) is disposed inside the rear longitudinal beam rear segment (122) and is parallel to the rear segment bottom wall (1221), a front end of the rear longitudinal beam rear segment strengthening plate (125) extends to a division surface of the second segment and the first segment, a rear end of the rear longitudinal beam rear segment strengthening plate (125) extends to a division surface of the second segment and the third segment, and the rear longitudinal beam rear segment support plate (126A, 126B) is supported between the rear longitudinal beam rear segment (122) and the rear segment bottom wall (1221).

13. An electric vehicle, comprising the vehicle body structure according to claim 1.

14. The vehicle body structure according to claim 7, wherein the electric vehicle further comprises an electric control device (740) mounted on the floor panel (300), the rear longitudinal beam (120) sequentially comprises a first segment, a second segment, a third segment and a fourth segment from back to front, the second segment corresponds to the electric control device (740) in a lateral direction of the vehicle, a strength of the second segment is greater than a strength of the first segment and a strength of the third segment, and two ends of a motor anti-collision beam (440) are connected to the second segment.

15. The vehicle body structure according to claim 14, wherein a strength of the fourth segment is greater than the strength of the first segment and the strength of the third segment, and the strength of the third segment is greater than the strength of the first segment.

16. The vehicle body structure according to claim 14, wherein the rear longitudinal beam (120) comprises a rear longitudinal beam front segment (121) and a rear longitudinal beam rear segment (122) connected to each other, a rear longitudinal beam rear segment strengthening structure and a rear longitudinal beam rear segment weakening structure are disposed in the rear longitudinal beam rear segment, the rear longitudinal beam rear segment weakening structure is located in the first segment, and the rear longitudinal beam rear segment strengthening structure is located in the second segment.

17. The vehicle body structure according to claim 16, wherein the rear longitudinal beam rear segment weakening structure comprises a crumpling rib (1223) and a crumpling hole.

18. The vehicle body structure according to claim 16, wherein the rear longitudinal beam rear segment (122) forms a grooved structure with an opening upward, and comprises a rear segment bottom wall (1221) and two rear segment side walls (1222) disposed opposite to each other, the rear longitudinal beam rear segment strengthening structure comprises a rear longitudinal beam rear segment strengthening plate (125) and a rear longitudinal beam rear segment support plate (126A, 126B), the rear longitudinal beam rear segment strengthening plate (125) is disposed inside the rear longitudinal beam rear segment (122) and is parallel to the rear segment bottom wall (1221), a front end of the rear longitudinal beam rear segment strengthening plate (125) extends to a division surface of the second segment and the first segment, a rear end of the rear longitudinal beam rear segment strengthening plate (125) extends to a division surface of the second segment and the third segment, and the rear longitudinal beam rear segment support plate (126A, 126B) is supported between the rear longitudinal beam rear segment (122) and the rear segment bottom wall (1221).

\* \* \* \* \*